Sept. 26, 1933.   W. G. MYLIUS ET AL   1,927,899
GRAPHIC METER
Filed Sept. 13, 1928   3 Sheets-Sheet 1

INVENTORS.
Walter G. Mylius
and Bert G. LaBar.
BY
ATTORNEY

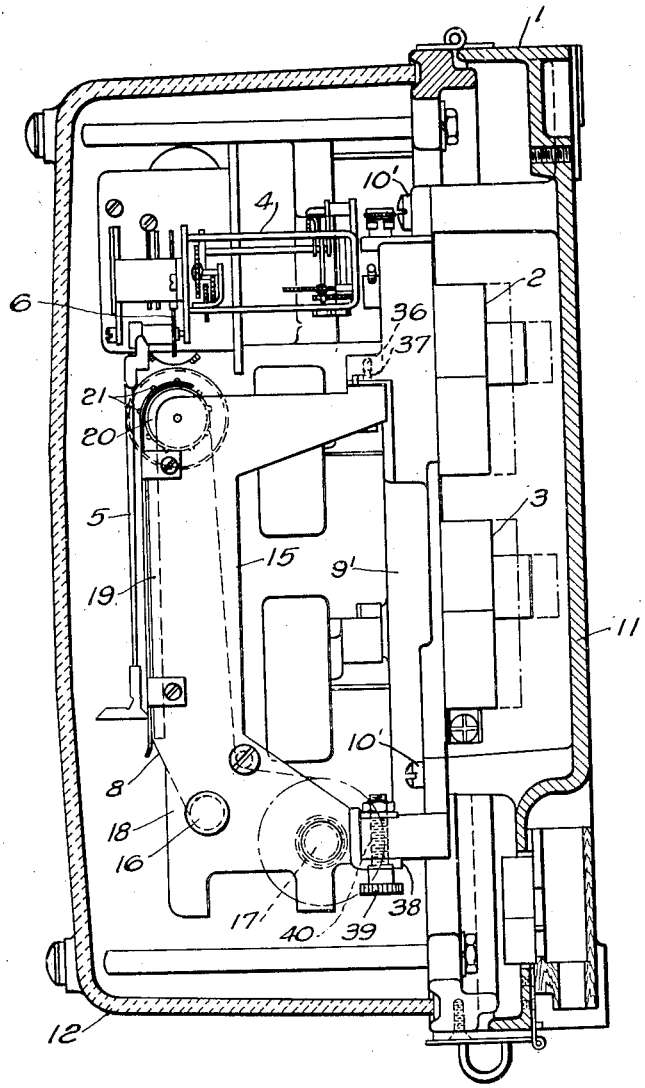

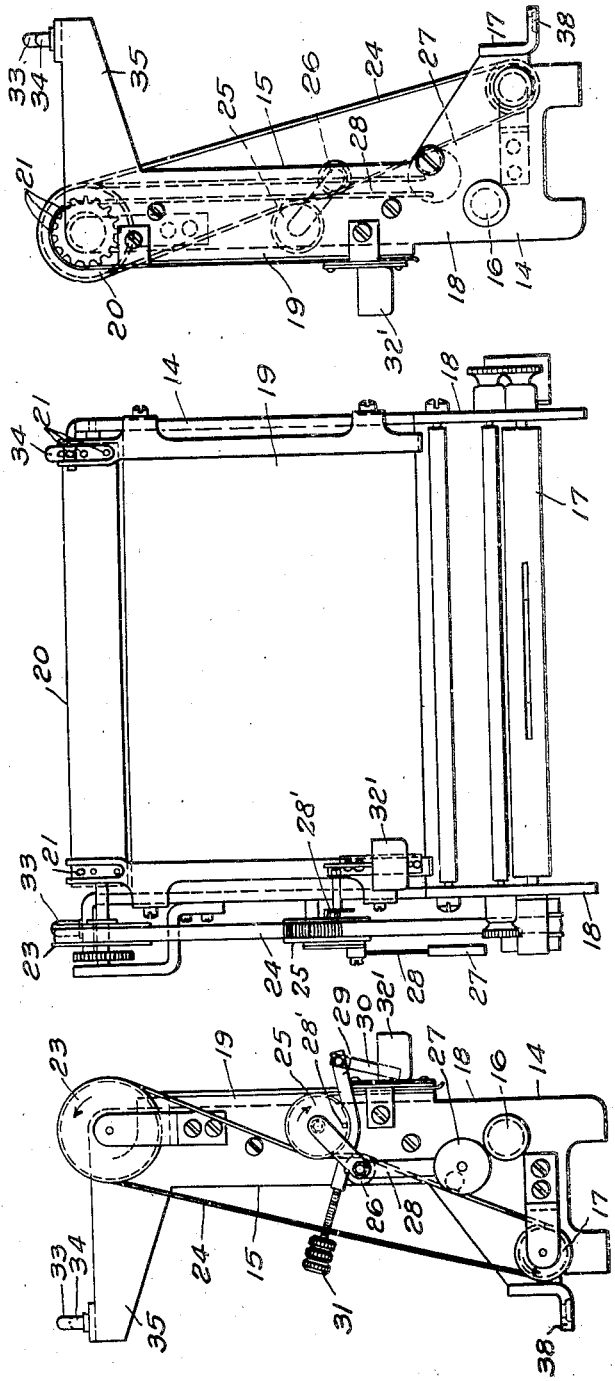

Patented Sept. 26, 1933

1,927,899

UNITED STATES PATENT OFFICE 1,927,899

GRAPHIC METER

Walter G. Mylius, Summit, and Bert G. La Bar, Union, N. J., assignors to Westinghouse Electric and Manufacturing Company, a corporation of Pennsylvania Application September 13, 1928
Serial No. 305,779

9 Claims. (Cl. 234—1)

Our invention relates to graphic meters and more particularly to paper roll mechanisms used in connection therewith.

In addition to having for an object to provide means for improving the general construction and reducing the cost of manufacture of graphic meters, our invention has for an object the provision of means for readily detaching the paper roll mechanism from the meter as a unit for inspection and repair, or partially detaching the same to permit the swinging thereof to a readily accessible position, whereby the chart may be easily renewed.

A further object of our invention is to provide means for exposing a considerable portion of the paper record-surface so that a large section of the record made thereon is always visible before the paper is rerolled.

Briefly our invention consists in building the paper roll mechanism as a unit detachable from the main frame of the meter by means of two pins of different lengths at the top of the mechanism, which cooperate with corresponding openings in the main frame. In the first step the mechanism is lowered about ⅛ of an inch which permits it to swing on the longer of the pins as an axis to permit the changing of the paper chart. The mechanism may be completely removed in the next step by further lowering the same. An increased length of chart is made possible by passing it over a relatively long flat plate, provided for that purpose and which constitutes a backing for the paper to facilitate marking by the stylus.

Our invention, however, may be more clearly understood if the accompanying drawings are consulted in connection with the following description.

In the drawings:

Fig. 2 is a view in side elevation partially in cross-section of the meter shown in Fig. 1;

Fig. 3 is a view in front elevation of our paper roll mechanism, the paper being omitted;

Fig. 4 is a view in elevation of one side of the paper roll mechanism shown in Fig. 3; and Fig. 5 is a view similar to Fig. 4 of the other side of the paper roll mechanism.

Figure 1:
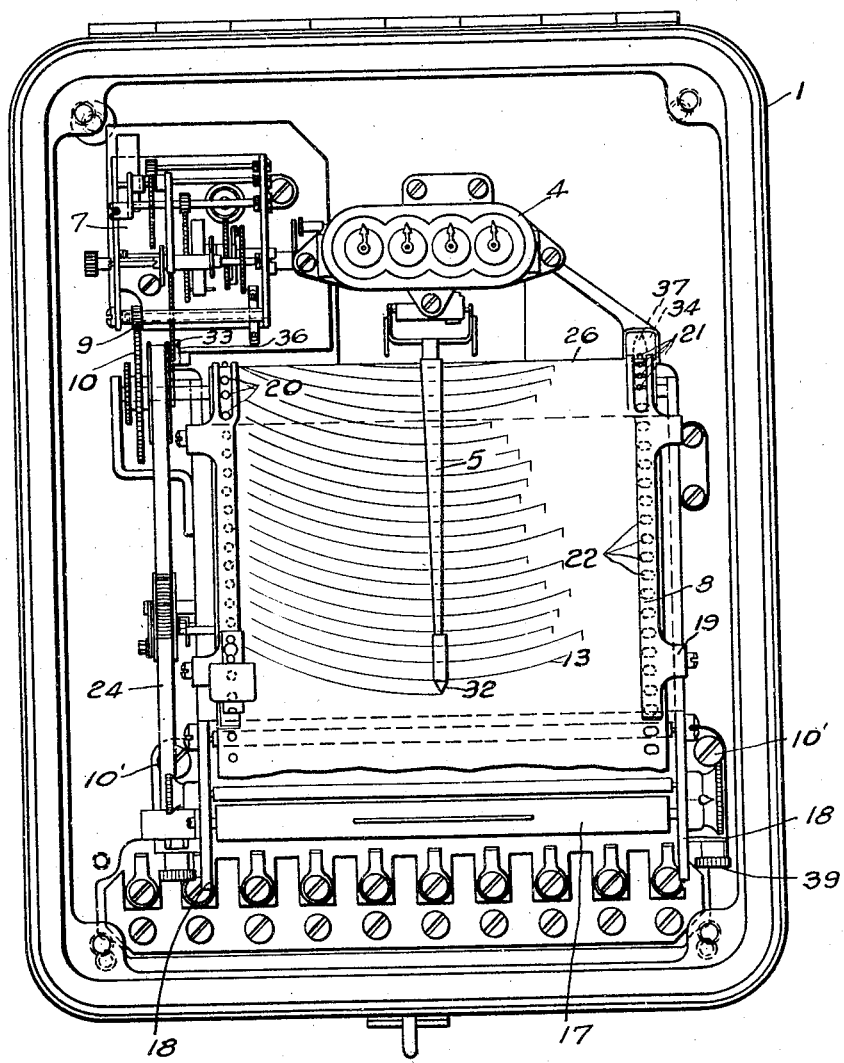
Figure 1 is a view in front elevation of a graphic demand meter constructed in accordance with our invention.

The illustrated graphic meter 1 is of the maximum demand recording type and comprises, in general, rotating measuring instruments 2 and 3 (Fig. 2) that operate an integrating mechanism 4 and a stylus 5 through a disconnectible gear drive 6. A motor operated mechanism 7 advances the paper 8 at a predetermined constant rate by means of gear wheels 9 and 10. The mechanism 7 also disconnects the gear drive 6 at the end of equal predetermined intervals of time, such as every 15 minutes, to permit the stylus 5 to be returned by gravity to an initial zero position.

All of the above mentioned elements or mechanisms are mounted on a main frame 9' that is secured by means of screw bolts 10' to the base 11 of the meter 1. The entire meter is enclosed in a casing 12 that is provided with a glass covered opening so disposed that the integrating dials 4 and the record 13 on the chart 8 may be easily inspected and read.

Referring to Figs. 3 to 5 inclusive of the drawings, the paper roll mechanism 14 consists of a separate unitary structure 15 for carrying the paper 8 and supply and reroll spools 16 and 17 therefor that are journalled between side supports 18. The paper is threaded from the supply roll 16 over the face of a flat plate 19, around a spindle or drum 20 and thence to the reroll spool 17. Projections 21 are disposed adjacent to the ends of the spindle 20 and are adapted to engage suitably spaced perforations 22 provided in the borders of the paper 8. The spindle 20 is rotated at a constant speed by the motor mechanism 7 and effects movement of the chart at a uniform rate of speed.

A pulley wheel 23 is mounted on the same shaft with the drum 20 to drive the reroll spool 17 through a resilient belt 24 that is maintained in proper tension by idler pulley wheels 25 and 26. The wheels 25 and 26 are caused to act on opposite sides of the belt 24 by means of a weight 27 secured to the end of a pivoted arm 28 to take up any looseness in the belt 24.

A pin 28' projects from the wheel 25 and coacts with a member 29 that is pivotally mounted on the side of the frame 18. The member 29 follows the movement of the pin 28, and the movement is controlled by means of an adjustable counterbalancing weight 31. An ink dropper 30 is secured to one end of the member 29, and cooperates with an ink well 32' as the member is reciprocated, so that the pen 32 of the stylus 5 is refilled at regular intervals by the ink dropper 30.

All of the paper roll mechanism 14, as described above, is constructed as a detachable unit. Our improved method of mounting the paper roll mechanism 14 to the frame 9' includes a pair of pins 33 and 34 of different lengths that project upwardly from the projections 35 of the side members 15. Suitable openings 36 and 37 (Fig. 1) are provided in the frame 9' for the reception of the pins 33 and 34, respectively. Extending from the lower portion of the paper roll mechanism 14 are projections 38 having slots therein for the reception of thumb screws 39 that are mounted in brackets 40 of the frame 9'.

By loosening the thumb screws 39 so that the paper roll mechanism 14 is lowered about ⅛ of an inch, the shorter pin 34 clears the opening 37 and the mechanism may be swung to the left about the longer pin 33 and the screw 39 as an axis. In such position the paper rolls may be reloaded very easily without fear of any misalignment or loss of parts. After reloading, the mechanism may be swung back and secured in proper position by tightening the screws 39.

If it becomes necessary to entirely remove the paper roll mechanism 14 from the rest of the meter, this function may be accomplished by merely loosening the screw 39 until both of the pins 33 and 34 clear their corresponding openings in the frame 9'. The ends of the projections 35 and 38 are built so as to be in a plane parallel with respect to the plane of the front of the mechanism, so that the unit may be placed on any conveniently available flat surface for inspection or repair.

We consider the following features to be novel and patentably distinct from the prior art: First, the paper roll mechanism may be lowered a slight distance and swung outwardly from the meter whereby the paper may be conveniently changed. Second, the paper roll mechanism is made as a complete unit, which may be removed entirely from the meter to facilitate replacing the paper, or it can be placed on any flat surface to facilitate adjustments and inspection. And third, a much larger section of the record is presented than has been available in prior graphic meters of which we are aware.

We claim as our invention:

1. In a recording device, the combination with a chart carrier and a support therefor, of means including elements cooperating between the carrier and the support to hold the same together and operable to release the carrier to move along a pivot axis thereof to a position for movement about said axis while the carrier is connected to the support.

2. In a recording device, the combination with a chart carrier and a support therefor, of means including elements cooperating between the carrier and the support to hold the same together and operable to release the carrier to move along a pivot axis thereof to a position for movement about said axis while the carrier is connected to the support, said means being operable to provide further movement of the carrier along said axis to separate the carrier from the support.

3. In a recording device, the combination with a chart carrier and a support therefor, of means comprising elements cooperating between the carrier and the support to hold the same together and including an operating member to release the carrier for movement relative to the support while the carrier is connected to the support, said operating member also being operable to provide for separation of the carrier from the support.

4. In a recording device, the combination with a support, of a chart carrier removably supported thereby and including elements having surfaces laterally distributed relative to each other in a common plane and substantially constituting legs to support the carrier in stable equilibrium on a flat surface when the carrier is detached from the support.

5. In a recording device, the combination with a support, of vertically axially aligned upper and lower pivot elements thereon, and means including a chart carrier embodying similarly aligned upper and lower pivot elements cooperating with said first pivot elements, respectively, to permit the carrier to be pivotally moved relative to the support and to be moved along the pivot axis.

6. In a recording device, the combination with a support, of vertically axially aligned upper and lower pivot elements thereon, an upper locking element on the support, and means including a chart carrier embodying similarly aligned upper and lower pivot elements cooperating with said first pivot elements, respectively, and an upper locking element cooperating with said first locking element to permit the carrier to be pivotally moved relative to the support and to be moved along the pivot axis to effect locking and unlocking cooperation between said locking elements.

7. In a recording device, the combination with a support, of vertically axially aligned upper and lower pivot elements thereon, the upper pivot element constituting a socket element, an upper locking element in the support also constituting a socket element, means including a chart carrier embodying similarly aligned upper and lower pivot elements cooperating with said first pivot elements, respectively, the upper pivot element on the carrier constituting a pin for reception in said socket, and an upper locking element constituting a pin shorter than said first pin for reception in said locking element socket, and means adjacent to the lower edge of the carrier for holding the same immovable on the support, releasing the carrier to move along its pivot axis to a position in which it may pivotally move relative to the support and further releasing the carrier for separation from the support.

8. In a recording mechanism including a main supporting frame and a chart-carrying structure, means for mounting said structure on said main supporting frame whereby said structure may be either partially or completely detached therefrom, said means including two pins of different lengths extending from one end of said structure on opposite sides thereof, openings for the reception of said pins in said frame, and means cooperating with said frame and said structure for controlling the detachability of said structure.

9. In a recording meter including a frame and a chart-holding-and-moving device associated therewith, means for mounting said device as a removable unit on said frame including two pins of different lengths extending from one end of said device, said pins cooperating with openings in said frame, and means for controlling the position of said pins with respect to said openings whereby said device may be either clamped in position or turned about the longer pin as an axis.

WALTER G. MYLIUS.
BERT G. LA BAR.